United States Patent
Turtinen et al.

(10) Patent No.: US 12,150,179 B2
(45) Date of Patent: Nov. 19, 2024

(54) INDICATION OF RANDOM ACCESS RESPONSE TRANSMISSION

(71) Applicant: Nokia Technologies Oy, Espoo (FI)

(72) Inventors: Samuli Turtinen, Ii (FI); Benoist Sebire, Tokyo (JP); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 575 days.

(21) Appl. No.: 17/438,668

(22) PCT Filed: Apr. 4, 2019

(86) PCT No.: PCT/CN2019/081549
§ 371 (c)(1),
(2) Date: Sep. 13, 2021

(87) PCT Pub. No.: WO2020/199204
PCT Pub. Date: Oct. 8, 2020

(65) Prior Publication Data
US 2022/0159728 A1    May 19, 2022

(51) Int. Cl.
*H04W 74/0833* (2024.01)
*H04W 74/00* (2009.01)
*H04W 74/0808* (2024.01)

(52) U.S. Cl.
CPC ..... *H04W 74/0833* (2013.01); *H04W 74/006* (2013.01); *H04W 74/0808* (2013.01)

(58) Field of Classification Search
None
See application file for complete search history.

(56) References Cited

U.S. PATENT DOCUMENTS

2009/0180436 A1\* 7/2009 Vujcic ............... H04L 23/02
370/330
2010/0002590 A1\* 1/2010 Park ............... H04W 74/006
370/329

(Continued)

FOREIGN PATENT DOCUMENTS

| CN | 105873229 A | 8/2016 |
| WO | 2016/153290 A1 | 9/2016 |
| WO | 2020/164079 A1 | 8/2020 |

OTHER PUBLICATIONS

"Revised SID on NR-based Access to Unlicensed Spectrum", 3GPP TSG RAN Meeting #80, RP-181339, Agenda: 9.4.3, Qualcomm Incorporated, Jun. 11-14, 2018, 5 pages.

(Continued)

*Primary Examiner* — Alpus Hsu
*Assistant Examiner* — Camquyen Thai
(74) *Attorney, Agent, or Firm* — Robert P. Michal, Esq.; Carter, DeLuca & Farrell LLP

(57) ABSTRACT

Systems, methods, apparatuses, and computer program products for random access procedures are provided. One method may include provide at least one random access channel occasion (RO) to at least one lower layer. The method may optionally include receiving at least one indication of the at physical layer least one RO from the at least one lower layer. The method may further include initiating at least one timer configured to monitor at least one control channel based on the at least one indication.

1 Claim, 2 Drawing Sheets

(56) References Cited

U.S. PATENT DOCUMENTS

| | | | |
|---|---|---|---|
| 2010/0041428 A1* | 2/2010 | Chen | H04W 52/367 |
| | | | 455/522 |
| 2010/0182992 A1* | 7/2010 | Chun | H04W 72/21 |
| | | | 370/350 |
| 2011/0310857 A1* | 12/2011 | Vujcic | H04W 74/0833 |
| | | | 370/336 |
| 2015/0049712 A1 | 2/2015 | Chen et al. | |
| 2016/0323915 A1 | 11/2016 | Liu et al. | |
| 2017/0006640 A1* | 1/2017 | Dinan | H04W 74/0833 |
| 2018/0048498 A1 | 2/2018 | Stern-Berkowitz et al. | |
| 2019/0190661 A1* | 6/2019 | You | H04W 74/0833 |
| 2020/0008246 A1* | 1/2020 | Dinan | H04W 74/0833 |
| 2020/0296635 A1* | 9/2020 | Rastegardoost | H04W 72/23 |
| 2020/0314708 A1* | 10/2020 | Jassal | H04W 16/28 |
| 2021/0168862 A1* | 6/2021 | Murray | H04W 74/002 |
| 2021/0212112 A1* | 7/2021 | Jia | H04B 7/0626 |

OTHER PUBLICATIONS

"New WID on NR-based Access to Unlicensed Spectrum", 3GPP TSG RAN Meeting #82, RP-182878, Agenda: 9.1.1, Qualcomm Incorporated, Dec. 10-13, 2018, 8 pages.

"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.

"3rd Generation Partnership Project; Technical Specification Group Radio Access Network; NR; Physical layer procedures for control (Release 15)", 3GPP TS 38.213, V15.4.0, Dec. 2018, pp. 1-104.

"Handling of RA counters and timers in NR-U", 3GPP TSG-RAN WG2 #105, R2-1901673, Agenda: 11.2.1.1, Ericsson, Feb. 25-Mar. 1, 2019, 3 pages.

International Search Report and Written Opinion received for corresponding Patent Cooperation Treaty Application No. PCT/CN2019/081549, dated Dec. 27, 2019, 9 pages.

Extended European Search Report received for corresponding European Patent Application No. 19923552.4, dated Sep. 23, 2022, 10 pages.

"MAC behaviour for LBT failures in Msg1 and Msg3 transmissions", 3GPP TSG-RAN WG2 Meeting #105bis, R2-1904432, Agenda: 11.2.1.1, MediaTek Inc, Apr. 8-12, 2019, 4 pages.

"4-step RACH procedures for NR-U", 3GPP TSG-RAN2#105, R2-1902200, Agenda: 11.2.1.1, Qualcomm Incorporated, Feb. 25-Mar. 1, 2019, 4 pages.

"Increasing Msg1 Transmission Opportunities for NR-U", 3GPP TSG-RAN WG2 Meeting #105bis, R2-1903078, Agenda: 11.2.1.1, vivo, Apr. 8-12, 2019, 5 pages.

"4-step RACH procedure for NR-U", 3GPP TSG RAN WG2 NR #105bis Meeting, R2-1903537, Agenda: 11.2.1.1, ZTE Corporation, Apr. 8-12, 2019, 4 pages.

Rejection Decision received for corresponding Chinese Patent Application No. 201980095226.5, dated Aug. 15, 2024, (6 pages), English Translation (3 pages), 9 pages total.

* cited by examiner

INDICATION OF RANDOM ACCESS RESPONSE TRANSMISSION

RELATED APPLICATION

This application claims priority to PCT Application No. PCT/CN2019/081549, filed on Apr. 4, 2019 which is incorporated herein by reference in its entirety.

BACKGROUND

Field

Certain embodiments may relate to communication systems, such as Long Term Evolution (LTE) or fifth generation (5G) radio access technology or new radio (NR) access technology, or other communications systems. For example, some embodiments may relate to random access procedures in such systems.

Description of the Related Art

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR provides bitrates on the order of 10-20 Gbit/s or higher, and can support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

In accordance with some embodiments, a method may include providing at least one random access channel occasion (RO) to at least one lower layer. The method may optionally include receiving at least one indication of at least one RO from the at least one lower layer. The indicated at least one RO may be one that has succeeded a listen before talk (LBT). In an embodiment, the method may further include initiating at least one timer configured to monitor at least one control channel based on the at least one indication.

In accordance with some embodiments, an apparatus may include means for providing at least one random access channel occasion (RO) to at least one lower layer. The apparatus may optionally include means for receiving at least one indication of at least one RO from the at least one lower layer. The indicated at least one RO may be one that has succeeded a listen before talk (LBT). In an embodiment, the apparatus may further include means for initiating at least one timer configured to monitor at least one control channel based on the at least one indication.

In accordance with some embodiments, an apparatus may include at least one processor and at least one memory including computer program code. The at least one memory and the computer program code can be configured to, with the at least one processor, cause the apparatus to at least provide at least one random access channel occasion (RO) to at least one lower layer. The at least one memory and the computer program code can be optionally configured to, with the at least one processor, cause the apparatus to at least receive at least one indication of at least one RO from the at least one lower layer. The indicated at least one RO may be one that has succeeded a listen before talk (LBT). In an embodiment, the at least one memory and the computer program code may be further configured to, with the at least one processor, cause the apparatus to at least initiate at least one timer configured to monitor at least one control channel based on the at least one indication.

In accordance with some embodiments, a non-transitory computer readable medium can be encoded with instructions that may, when executed in hardware, perform a method. The method may include providing at least one random access channel occasion (RO) to at least one lower layer. The method may optionally include receiving at least one indication of at least one RO from the at least one lower layer. The indicated at least one RO may be one that has succeeded a listen before talk (LBT). In an embodiment, the method may further include initiating at least one timer configured to monitor at least one control channel based on the at least one indication.

In accordance with some embodiments, a computer program product may perform a method. The method may include providing at least one random access channel occasion (RO) to at least one lower layer. The method may optionally include receiving at least one indication of at least one RO from the at least one lower layer. The indicated at least one RO may be one that has succeeded a listen before talk (LBT). In an embodiment, the method may further include initiating at least one timer configured to monitor at least one control channel based on the at least one indication.

In accordance with some embodiments, an apparatus may include circuitry configured to provide at least one random access channel occasion (RO) to at least one lower layer. The circuitry may further be configured to optionally receive at least one indication of at least one RO from the at least one lower layer. The indicated at least one RO may be one that has succeeded a listen before talk (LBT). In an embodiment, the circuitry may be configured to initiate at least one timer configured to monitor at least one control channel based on the at least one indication.

BRIEF DESCRIPTION OF THE DRAWINGS

For proper understanding of this disclosure, reference should be made to the accompanying drawings, wherein.

DETAILED DESCRIPTION

Figure 1:
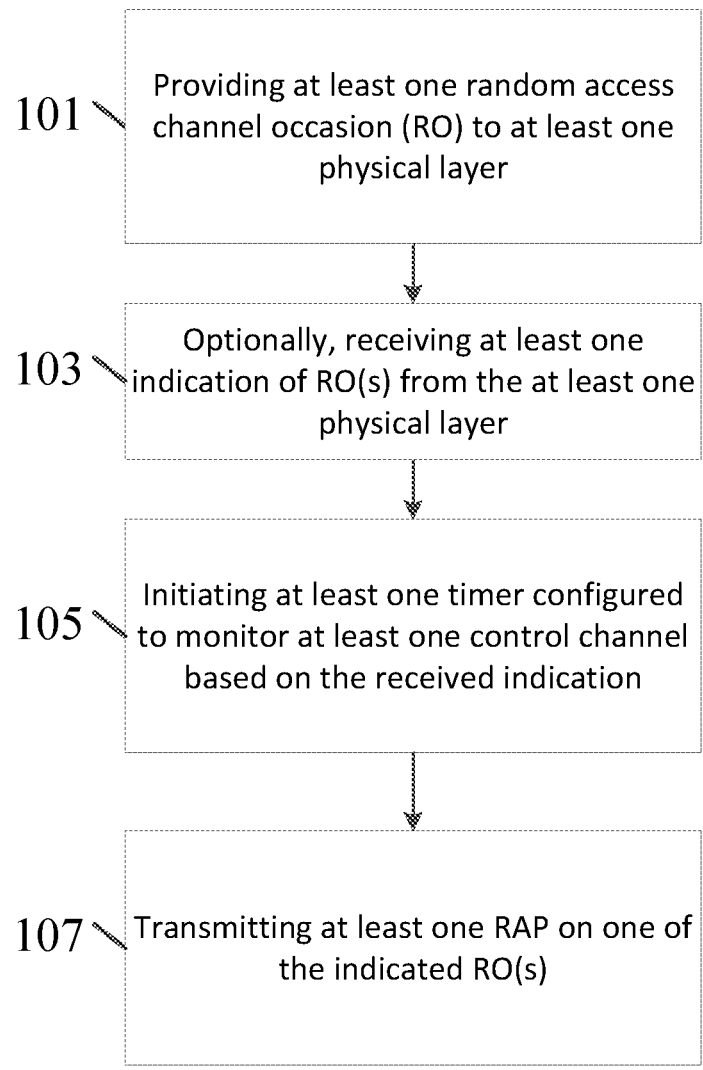
FIG. 1 illustrates an example of a method performed by a user equipment according to certain embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for random access procedures, for example when operating in unlicensed spectrum, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

3GPP RP-181339 includes updates to TR 38.889, where 4-step and 2-step random access channel (RACH) procedures will be supported for NR unlicensed (NR-U). For 4-step RACH procedure, the messages in time order are named as msg1, msg2, msg3, msg4, while for 2-step RACH procedure, the messages are named msgA and msgB. Specifically, 2-step RACH procedure includes two steps for completing a complete contention-based random access (CBRA). A 2-step RACH procedure may provide a reduction in the impact of listen before talk (LBT) through its reduction in the number of messages. However, in order to further reduce the impact of LBT failures, additional opportunities for the RACH messages may be introduced for both 4-step and 2-step RACH procedures, such as in time or frequency domain. In particular, the additional opportunities for 4-step RACH procedure may be applicable to both msg1 and msg3. NR-U may support contention-free random access (CFRA) and CBRA for both 2-step and 4-step RACH procedure. With respect to secondary cells (SCells), CFRA may be supported as a baseline, while both CBRA and CFRA are supported on special cells (SpCells). A single RACH procedure i may be used, and multiple RACH procedures in parallel may not be supported for NR-U. As a baseline, the random access response for msg1 may be on a SpCell, while msg3 may be assumed to use a predetermined hybrid automatic repeat request (HARQ) identification (ID).

In legacy RACH procedure, counters for preamble transmission and power ramping may be increased with each attempt. In NR-U, power ramping may not be applied when the preamble is not transmitted due to LBT failure. As a result, an indication might be transmitted from the physical (PHY) layer to the MAC to indicate LBT failure/success. In addition, ra-Response Window may not be started when the preamble is not transmitted due to LBT failure. It is assumed that ra-ContentionResolutionTimer may need to be extended with larger values to overcome the impact of LBT.

For 2-step RACH procedure, msgA may be a signal to detect the UE and a payload, while the second message, msgB, may be for contention resolution for CBRA with a possible payload. msgA may at least include the equivalent information to that which is transmitted in msg1 and msg3 for 4-step RACH procedure. The contention resolution in 2-step RACH procedure may be performed by including a UE identifier in the first message, which may be echoed in the second message.

Due to possible LBT failures, some data transmissions may not occur when the channel is busy. Thus, it may be desirable to provide more opportunities to transmit RACH messages. For example, MAC may indicate multiple RACH occasions (RO) to lower layer (e.g., the physical layer) for which to attempt the preamble transmission, and the preamble transmission may be based on the LBT outcome.

Once the random access preamble is transmitted, and regardless of the possible occurrence of a measurement gap, the MAC entity may start a timer, and monitor for a control channel transmission. For example, as specified in 3GPP NR release 15, if a contention-free Random Access Preamble for beam failure recovery request was transmitted, the MAC entity may start the ra-Response Window configured in BeamFadureRecoveryConfig, at the first physical downlink control channel (PDCCH) occasion from the end of the Random Access Preamble transmission, and monitor for a PDCCH transmission on the search space indicated by recoverySearchSpaceId of the SpCell identified by the cell radio network temporary identifier (C-RNTI), while the ra-Response Window is running. In another example, the MAC entity may start the ra-Response Window configured in RACH-ConfigCommon at the first PDCCH occasion from the end of the Random Access Preamble transmission and monitor the PDCCH of the SpCell for random access response identified by the random access radio network temporary identifier (RA-RNTI) while the ra-Response Window is running. If notification of a reception of a PDCCH transmission on the search space indicated by recoverySearchSpaceId is received from lower layers on the serving cell where the preamble was transmitted, if the PDCCH transmission is addressed to the C-RNTI, and if the contention-free Random Access Preamble for beam failure recovery request was transmitted by the MAC entity, the MAC entity may consider the Random Access procedure successfully completed. Otherwise, if a downlink assignment has been received on the PDCCH for the RA-RNTI and the received transport block (TB) is successfully decoded, and if the random access response contains a MAC sub-protocol data unit (subPDU) with backoff indicator, the MAC entity may set the PREAMBLE BACKOFF to a value of the backoff indicator (BI) field of the MAC subPDU using Table 7.2-1, multiplied with SCALING FACTOR BI. Otherwise, the MAC entity may set the PREAMBLE BACK-OFF to 0 ms. Finally, if the random access response contains a MAC subPDU with random access preamble identifier corresponding to the transmitted PREAMBLE INDEX, the MAC entity may consider the random access response reception as being successful.

When the MAC layer indicates multiple transmission opportunities to PHY layer to attempt preamble transmissions by indicating multiple ROs with preambles in either or both frequency and time domain, the RAR window start for each of the ROs may differ, especially when the ROs are in time domain. Furthermore, even in frequency domain, different ROs may be associated with different RA-RNTIs. With the Release-15 scheme, the MAC layer may select exactly one RO and preamble for PHY layer to transmit, where MAC layer knows which RA-RNTI and RAR window start time to use. However, this may not be possible for the MAC when multiple transmission opportunities are provided to PHY layer. Furthermore, PHY layer providing solely LBT failure/success indications is infeasible since there may be multiple LBT success occasions, for example, in frequency domain but where only one preamble is transmitted by PHY layer. In such case, for instance, knowing the proper RA-RNTI to monitor or the correct time position to start the RAR window may not be possible.

Similarly, for a 2-step RACH, different ROs may be linked to at least one different physical uplink shared channel (PUSCH) resource for msgA. The starting point for msgB monitoring may differ based on which RO and the PUSCH the PHY layer selects.

Certain embodiments described herein may enable the MAC layer to begin correct monitoring of RAR window for random access response message reception and/or msgB window (which may be dictated by a contention resolution timer) for msgB message reception. For example, monitoring may begin at the first PDCCH occasion from the end of the actual RA preamble/PUSCH transmission. Furthermore, certain embodiments may monitor correct RNTI, for example RA-RNTI or C-RNTI, to be able to monitor correctly a response to the preamble transmission. Additionally, this may also allow using a proper length for the RAR window. Additionally, certain embodiments may enable proper processing of the received RAR since the RO indicates whether the CBRA/CFRA preamble was actually transmitted. Certain embodiments are, therefore, directed to improvements in computer-related technology, specifically, by conserving network resources and reducing power consumption of network entities and/or user equipment located within the network.

Some embodiments described herein may include transmitting a lower layer indication to a MAC layer with at least one indication of at least one RO where the RA preamble is actually transmitted by the lower layer. In an embodiment, the lower layer may be PHY layer and, thus, the RA preamble may be transmitted by the PHY layer. As a result, the MAC layer may start at least one RAR window at a first PDCCH occasion from the end of the actual RA preamble transmission and may utilize a correct search space. In certain embodiments, for 2-step RACH procedure, at least one monitoring window for msgB may be started at a correct time, such as at the first PDCCH occasion after the PUSCH transmission linked to the selected RO and/or PUSCH. In an embodiment, the MAC layer may monitor for at least one correct RNTI, such as RA-RNTI and/or C-RNTI, as a response to the preamble transmission. In an embodiment, the MAC layer may monitor the at least one random access response using a proper length for the RAR window. The MAC layer may properly process the received RAR, as the at least one RO would indicate whether CBRA and/or CFRA preamble was transmitted.

In some embodiments, at least one LBT failure indication may only be indicated from the lower layer to the MAC layer when all preamble attempts for the provided ROs fail the LBT. Based on that at least one LBT failure indication, the MAC layer would not start the RAR window. Additionally and/or alternatively, a LBT failure indication is not provided from the lower layer to the MAC layer or may not include at least one indication of at least one RO, where the MAC layer may be configured to interpret the lack of the at least one indication of at least one RO as the occurrence of LBT failure for all ROs.

In certain embodiments, at least one RO selected by the PHY layer may be signaled to the MAC layer, and the MAC layer may be configured to determine at least one RAR window starting point and/or ending point. For example, the at least one RAR window starting point may be the earliest possible starting point among all the starting points of the at least one signaled RO, and/or the at least one RAR window ending point may be the latest possible ending point among all the ending points of the at least one signaled RO. Furthermore, in an embodiment, the at least one RNTI to be monitored by the MAC layer may include all of the possible RNTIs from the at least one signaled RO.

In some embodiments, the at least one RO selected by the PHY layer may belong to at least one LBT sub-band of the operated serving cell bandwidth and/or carrier. The LBT sub-band may consist of, e.g., 20 MHz part of the carrier while one carrier may consist multiple of such LBT sub-bands. In some embodiments when the MAC layer indicates multiple transmission opportunities to PHY layer to attempt preamble transmissions by indicating multiple ROs with preambles, the ROs may belong to different LBT sub-bands. In certain embodiments, at least one LBT sub-band of the RO selected by the PHY layer may be signaled to the MAC layer. As a result, the MAC layer may start at least one RAR window at a first PDCCH occasion from the end of the actual RA preamble transmission and may utilize a correct search space associated with the LBT sub-band indicated by the PHY layer. In some embodiments, the RAR window is started and/or monitored within the LBT sub-band indicated by the PHY layer. Hence, in some embodiments, the indication from PHY layer to MAC may consist of either RO information or LBT sub-band information or both of the RO information and LBT sub-band information of the transmitted random access preamble.

In some embodiments, if no signalling from PHY layer is received, the MAC layer may be configured to use at least one RAR window to assume that at least one RO has been used. For example, in this case, the starting point may be the earliest possible starting point among all possible ROs, and the ending point may be the latest possible ending point among all possible ROs. Furthermore, the at least one RNTI, which the MAC layer may be configured to monitor, may be associated with at least one or all RNTIs from the at least one signaled RO.

In some embodiments, the MAC layer may transmit at least one priority order to the PHY layer for the at least one selected RO, for example, to configure the PHY layer to select at least one CFRA RO over at least one CBRA RO when both have successful LBT.

In some embodiments, the lower layer may indicate to the MAC layer all the ROs which has succeeded LBT for at least one given time slot and, from all the ROs, the MAC layer may select one RO to transmit the at least one preamble.

FIG. 1 illustrates an example flow diagram of a method, according to one embodiment. In certain embodiments, the method of FIG. 1 may be performed by a network entity or node associated with a communications system, such as 5G or NR. According to one embodiment, the method of FIG. 1 may be performed by a mobile station, mobile device, UE, IoT device, terminal, or the like, for instance. Additionally or alternatively, the method of FIG. 1 may be performed by an entity such as a base station, access node, evolved node B (eNB) or next generation node B (gNB), a next generation radio access network (NG RAN), a serving gateway, a server, and/or any other access node or combination thereof. For example, in an embodiment, one or more of the steps of the method may be performed by a MAC layer or MAC entity of a UE, such as UE 210 illustrated in FIG. 2 discussed below.

As illustrated in the example of FIG. 1, in step 101, the method may include providing at least one random access channel occasion (RO) (which may also be referred to as physical random access channel occasion/PRACH occasion) to at least one physical layer. In step 103, the method may include, optionally, receiving at least one indication of at least one RO from the at least one physical layer. According to certain embodiments, the receiving 103 of the at least one indication may be optional because in some embodiments an indication might not be transmitted by the PHY. In an embodiment, when the at least one indication is received, the at least one indicated RO is a RO that has succeeded LBT. Further, in one embodiment, the indicated at least RO is where a random access preamble is transmitted.

According to certain embodiments, in step 105, the method may also include initiating at least one timer configured to monitor at least one control channel, e.g., PDCCH, based on the received at least one indication. In some embodiments, the method may also optionally include, in step 107, transmitting at least one random access preamble (RAP) on one of the indicated at least one RO.

According to some embodiments, based on the at least one indication of the at least one RO received from at least one lower layer (e.g., PHY), the method may include starting at least one RAR window at a first PDCCH occasion.

In some embodiments, if at least one notification of at least one PRACH occasion (i.e., RO) has been received from at least one lower layer and if at least one contention-free random access preamble for beam failure recovery request was transmitted, a medium access control (MAC) entity may start at least one random access response window (e.g., ra-Response Window), for example that may be configured in BeamFailureRecoveryConfig, at the first PDCCH occasion following the indicated PRACH occasion from the end of the RAP transmission.

In an embodiment, the first physical downlink control channel (PDCCH) occasion is the first physical downlink control channel (PDCCH) following the at least one RO indicated by the at least one physical layer.

According to some embodiments, based on the at least one indication received from the PHY layer, the method may include starting to monitor at least one of random access radio network temporary identifier (RA-RNTI) or cell radio network temporary identifier (C-RNTI) for a response to the at least one RAP transmission. In one example, the cell radio network temporary identifier (C-RNTI) may be monitored in a case where contention free random access preamble for beam failure was transmitted. According to an embodiment, the method may also include receiving a random access response, and properly processing the received random access response given that the at least one RO indicates whether a CBRA or CFRA preamble was actually transmitted.

In some embodiments, the method may further include determining a RAR window starting point and ending point. For instance, the starting point may be determined as an earliest possible starting point among all those of the at least one RO included in the at least one indication, and the ending point may be determined as a latest possible ending point among all those of the at least one RO included in the at least one indication. In an example embodiment, the method may include monitoring all possible RNTIs from the at least one RO included in the at least one indication.

According to certain embodiments, if the at least one indication of the at least one RO is not received from the at least one PHY layer, then the at least one random access preamble transmission has failed. For example, in one embodiment, when the at least one indication of the at least one RO is not received from the at least one PHY layer, then the MAC entity may deem that the preamble transmission has failed for all ROs and not start a RAR window.

In certain embodiments, if the at least one indication of the at least one RO is not received from the at least one physical layer, then the method may include determining a RAR window starting point and ending point and/or monitoring all possible RNTIs from the at least one RO provided to the at least one physical layer. For instance, in this example, the starting point may be determined as an earliest possible starting point among all those of the at least one RO provided to the PHY layer and the ending point may be determined as a latest possible ending point among all those of the at least one RO provided to the at least one PHY layer.

In an embodiment, the method may also include providing, to the at least one PHY layer, a priority order for multiple ROs provided to the at least one PHY layer. According to some embodiments, the method may include receiving, from the at least one PHY layer, an indication of the at least one RO that succeeded LBT for a given time slot, and selecting for which of the at least one RO that succeeded LBT to signal the RAP.

Additionally or alternatively, the method may include monitoring for at least one PDCCH transmission on at least one search space, for example, as indicated by a recovery search space identifier (e.g., recoverySearchSpaceId) of at least one SpCell identified by at least one C-RNTI while the random access response window (e.g., ra-ResponseWindow) is running.

In certain embodiments, if the at least one notification of PRACH occasion has been received from at least one lower layer (e.g., PHY layer), the MAC entity may start the RA response window (e.g., ra-Response Window) configured in RACH-ConfigCommon at the first PDCCH occasion following the indicated PRACH occasion from the end of the RAP transmission. Additionally or alternatively, the MAC entity may monitor the PDCCH of the SpCell for at least one random access response identified by the RA-RNTI corresponding to the indicated PRACH occasion while the ra-Response Window is running. Otherwise, in some embodiments, the MAC entity may perform the at least one RAP selection procedure.

Figure 2:
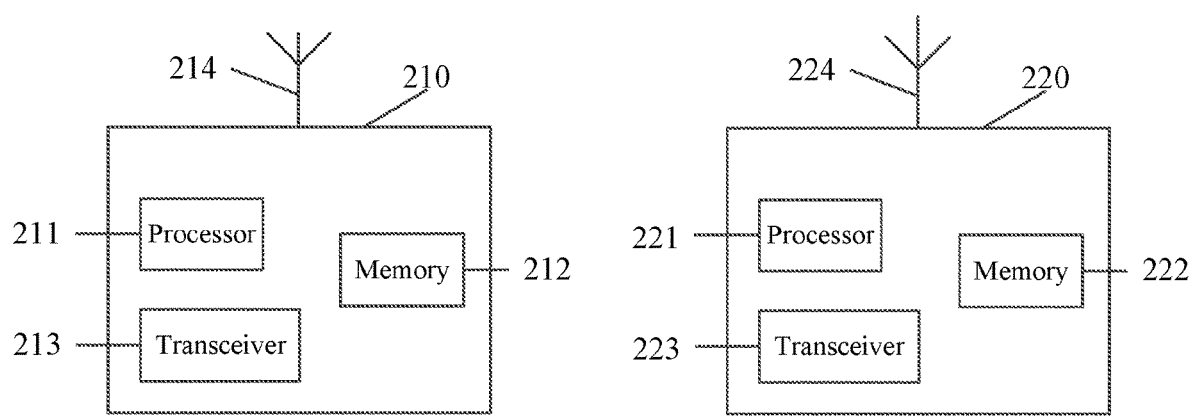
FIG. 2 illustrates an example of a system according to certain embodiments.

FIG. 2 illustrates an example of a system according to certain embodiments. In one embodiment, a system may include multiple devices, such as, for example, user equipment 210 and network entity 220. UE 210 may include one or more of a mobile station, mobile device, mobile phone, smart phone, personal digital assistant (PDA), tablet, IoT device, portable media player, digital camera, pocket video camera, video game console, navigation unit, such as a global positioning system (GPS) device, desktop or laptop computer, single-location device, such as a sensor or smart meter, or any combination thereof.

Network entity 220 may be one or more of a base station, an eNB or gNB, a NG RAN, a serving gateway, a server, and/or any other access node or combination thereof.

One or more of these devices may include at least one processor, respectively indicated as 211 and 221. At least one memory may be provided in one or more of devices indicated at 212 and 222. The memory may be fixed or removable. The memory may include computer program instructions or computer code contained therein. Processors 211 and 221 and memory 212 and 222 or a subset thereof, may be configured to provide means corresponding to the various blocks of FIG. 1. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 2, transceivers 213 and 223 may be provided, and one or more devices may also include at least one antenna, respectively illustrated as 214 and 224. The device may have many antennas, such as an array of antennas configured for multiple input multiple output (MIMO) communications, or multiple antennas for multiple radio access technologies. Other configurations of these devices, for example, may be provided.

Transceivers 213 and 223 may be a transmitter, a receiver, or both a transmitter and a receiver, or a unit or device that may be configured both for transmission and reception.

Processors 211 and 221 may be embodied by any computational or data processing device, such as a central processing unit (CPU), application specific integrated circuit (ASIC), or comparable device. The processors may be implemented as a single controller, or a plurality of controllers or processors.

Memory 212 and 222 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment 210 to perform any of the embodiments, steps, methods or processes described above, such as that described in connection with, for example, FIG. 1. Therefore, in certain embodiments, a non-transitory computer-readable medium may be encoded with computer instructions that, when executed in hardware, perform a process such as one or more of the processes, methods, or steps described herein. Alternatively, certain embodiments may be performed entirely in hardware.

In certain embodiments, an apparatus may include circuitry configured to perform any of the processes or functions illustrated in FIG. 1 or discussed above in connection with FIG. 1. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Therefore, certain example embodiments provide several technical improvements, enhancements, and/or advantages. For instance, example embodiments enable a MAC layer or entity to start RAR window/random access response message monitoring correctly, e.g., at the first PDCCH occasion from the end of the actual RA preamble/PUSCH transmission utilizing the correct search space. Further, example embodiments enable the MAC layer or entity to monitor the correct RNTI (e.g., RA-RNTI or C-RNTI) for response to the preamble transmission using proper length for the RAR window, and to process the received RAR properly given the RO would advise whether CBRA/CFRA preamble was actually transmitted. Accordingly, the use of certain example embodiments results in improved functioning of communications networks and their nodes including, for example, UEs, base stations, eNBs or gNBs.

In some example embodiments, the functionality of any of the methods, processes, signaling diagrams, algorithms or flow charts described herein may be implemented by software and/or computer program code or portions of code stored in memory or other computer readable or tangible media, and executed by a processor.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
    5G 5th Generation Wireless System
    CBRA Contention Based Random Access
    CE Coverage Enhancement
    CFRA Contention Free Random Access
    CN Core Network
    COT Channel Occupancy Time
    C-RNTI Cell Radio Network Temporary Identifier
    DCI Downlink Control Information
    DL Downlink
    DRS Discovery Reference Signal
    eMTC Enhanced Machine Type Communications
    eNB evolved Node B
    E-UTRAN Evolved Universal Mobile Telecommunications System Terrestrial Radio Access Network
    gNB Next Generation Node B
    LBT Listen Before Talk
    LTE Long Term Evolution
    MAC Medium Access Control
    MIMO Multiple Input Multiple Output
    MME Mobility Management Entity
    NE Network Entity
    NR New Radio (5G)
    NR-U New Radio-Unlicensed
    PBCH Physical Broadcast Channel
    PDCCH Physical Downlink Control Channel
    PDU Protocol Data Unit
    PHY Physical Layer
    PRACH Physical Random Access Channel
    PUSCH Physical Uplink Shared Channel
    RA Random Access
    RACH Random Access Channel
    RAN Radio Access Network
    RAR Random Access Response RA-RNTI Random Access Radio Network Temporary Identifier
RMSI Remaining Minimum System Information
RO Random Access Channel Occasion
SRS Sounding Reference Signal
SS Synchronization Signal
TB Transport Block
UE User Equipment

What is claimed is:

1. A method, comprising:
providing at least one random access channel occasion, RO, to at least one lower layer; and
receiving at least one indication of at least one RO from the at least one lower layer;
initiating at least one timer configured to monitor at least one control channel, based on the received at least one indication,
wherein the indicated at least one RO has succeeded a listen before talk, and at least one random access preamble has been transmitted on one of the indicated at least one RO;
based on the at least one indication of at least one RO received from at least one lower layer, starting at least one random access response window at a first control channel occasion, wherein the starting the at least one random access response window comprises:
determining a random access response window starting point and ending point, wherein the starting point is determined as an earliest possible starting point among all those of the at least one RO included in the at least one indication and the ending point is determined as a latest possible ending point among all those of the at least one RO included in the at least one indication;
monitoring all possible radio network temporary identifiers from the at least one RO included in the at least one indication;
monitoring for at least one physical downlink control channel, PDCCH, transmission on at least one search space indicated by a search space identifier of at least one special cell identified by at least one cell radio network temporary identifier, C-RNTI, while the random access response window is running;
if notification of a reception of at least one downlink control channel transmission on the at least one search space is received from the at least one lower layer on a serving cell where the preamble was transmitted, if the at least one downlink control channel transmission is addressed to the C-RNTI, and if a contention-free random access preamble for beam failure recovery request was transmitted, considering a random access procedure successfully completed; and
wherein, when the at least one indication is not received from at least one physical layer, the method further comprises:
determining that the at least one random access preamble transmission has failed;
determining a random access response window starting point and ending point, wherein the starting point is determined as an earliest possible starting point among all those of the at least one RO provided to the physical layer and the ending point is determined as a latest possible ending point among all those of the at least one RO provided to the at least one physical layer; and
monitoring all possible radio network temporary identifiers from the at least one RO provided to the at least one physical layer.

* * * * *